(12) United States Patent
Blumenthal et al.

(10) Patent No.: US 12,311,514 B2
(45) Date of Patent: May 27, 2025

(54) GRIPPING HAND TOOLS

(71) Applicant: Milwaukee Electric Tool Corporation, Brookfield, WI (US)

(72) Inventors: Aaron S. Blumenthal, Shorewood, WI (US); Aaron M. Williams, Milwaukee, WI (US); Michael Stearns, Milwaukee, WI (US); Christopher S. Hoppe, Midvale, UT (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 112 days.

(21) Appl. No.: 18/153,866

(22) Filed: Jan. 12, 2023

(65) Prior Publication Data

US 2023/0150096 A1 May 18, 2023

Related U.S. Application Data

(63) Continuation of application No. 16/745,042, filed on Jan. 16, 2020, now abandoned, which is a
(Continued)

(51) Int. Cl.
| | |
|---|---|
| *B25B 7/04* | (2006.01) |
| *B25B 7/14* | (2006.01) |
| *B23D 29/02* | (2006.01) |

(52) U.S. Cl.
CPC .................. *B25B 7/04* (2013.01); *B25B 7/14* (2013.01); *B23D 29/023* (2013.01)

(58) Field of Classification Search
CPC .... B25B 7/02; B25B 7/04; B25B 7/10; B25B 7/12; B25B 7/14; B25B 7/18; B25B 7/22;
(Continued)

(56) References Cited

U.S. PATENT DOCUMENTS

| | | |
|---|---|---|
| 2,584,353 A | 2/1952 | Keiser |
| 2,842,996 A | 7/1958 | Coslow et al. |

(Continued)

FOREIGN PATENT DOCUMENTS

| | | |
|---|---|---|
| CN | 2134261 Y | 5/1993 |
| CN | 1676277 A | 10/2005 |

(Continued)

OTHER PUBLICATIONS

International Search Report and Written Opinion for International Application No. PCT/US2020/013692, dated Jul. 1, 2020, 13 pages.

*Primary Examiner* — Robert J Scruggs
(74) *Attorney, Agent, or Firm* — Reinhart Boerner Van Deuren s.c.

(57) ABSTRACT

Various embodiments of pliers and pipe wrenches are provided. Wire cutters enable a finger pivot hole to enhance the grasp of the wire cutters while rotating the tool and/or stripping wire. Pipe wrenches include different configurations of teeth to improve durability and grip on a workpiece. Pliers are provided with axial teeth to enhance gripping a workpiece in different directions. Pliers are provided with selectable mechanical advantages so that a user may select the mechanical advantage desirable for a particular application.

14 Claims, 9 Drawing Sheets

Related U.S. Application Data continuation of application No. PCT/US2020/013692, filed on Jan. 15, 2020.

(60) Provisional application No. 62/793,276, filed on Jan. 16, 2019.

(58) Field of Classification Search
CPC ......... B25B 7/123; B25B 13/26; B25B 13/50; B25B 13/505; B25B 13/5058; B26B 17/02; B23D 29/02; B23D 29/023
See application file for complete search history.

(56) References Cited

U.S. PATENT DOCUMENTS

| | | | |
|---|---|---|---|
| 3,195,382 A | 7/1965 | Rommel et al. | |
| 3,704,620 A | 12/1972 | Allen | |
| 4,223,439 A | 9/1980 | Rommel | |
| 4,778,730 A | 10/1988 | Zucker | |
| 4,928,822 A | 5/1990 | Geisser | |
| 4,961,742 A | 10/1990 | Torre | |
| 5,927,159 A | 7/1999 | Yokoyama et al. | |
| 5,992,273 A | 11/1999 | Galea | |
| 6,098,508 A | 8/2000 | Battistone | |
| 6,286,358 B1 | 9/2001 | Beetz et al. | |
| 6,408,725 B1 | 6/2002 | Janson | |
| 6,474,130 B2 | 11/2002 | Battenfeld | |
| 6,625,832 B2 | 9/2003 | Montague et al. | |
| 6,973,859 B2 | 12/2005 | Noniewicz | |
| 7,155,954 B2 | 1/2007 | Battenfeld | |
| 7,444,851 B1 | 11/2008 | Janson | |
| 7,886,638 B2 | 5/2011 | Knoll et al. | |
| 9,061,398 B2 * | 6/2015 | Poole | B26B 13/26 |
| 9,962,813 B2 | 5/2018 | Buchanan | |
| 10,933,513 B2 * | 3/2021 | Wang | B25B 7/10 |
| 2002/0069537 A1 | 6/2002 | Wenzler | |
| 2004/0163495 A1 | 8/2004 | Konen | |
| 2006/0027458 A1 | 2/2006 | Webster et al. | |
| 2007/0118994 A1 | 5/2007 | Konen | |
| 2007/0221016 A1 | 9/2007 | Herbst et al. | |
| 2007/0251291 A1 | 11/2007 | Lavallee | |
| 2008/0307932 A1 | 12/2008 | Lauzon et al. | |
| 2009/0031866 A1 * | 2/2009 | Galloway | B25B 13/28 81/385 |
| 2010/0192735 A1 | 8/2010 | Kelly | |
| 2011/0167642 A1 | 7/2011 | Steele et al. | |
| 2016/0288298 A1 | 10/2016 | Chen | |
| 2019/0076994 A1 | 3/2019 | Blumenthal et al. | |

FOREIGN PATENT DOCUMENTS

| | | |
|---|---|---|
| CN | 2846025 Y | 12/2006 |
| CN | 2850826 Y | 12/2006 |
| CN | 2917780 Y | 7/2007 |
| CN | 200967179 Y | 10/2007 |
| CN | 103639955 A | 3/2014 |
| CN | 103492127 B | 1/2016 |
| CN | 206029643 U | 3/2017 |
| DE | 2555071 C2 | 4/1982 |
| DE | 3118528 A1 | 2/1983 |
| DE | 3224989 A1 | 1/1984 |
| DE | 3323666 A1 | 1/1985 |
| DE | 9421115 U1 | 5/1995 |
| DE | 4419862 C1 | 11/1995 |
| DE | 19709639 A1 | 9/1998 |
| DE | 29901395 U1 | 7/1999 |
| DE | 19924086 C2 | 8/2002 |
| DE | 19949511 B4 | 10/2008 |
| DE | 202014100359 U1 | 3/2014 |
| EP | 0471977 B1 | 6/1995 |
| EP | 2826595 A1 | 1/2015 |
| EP | 2632640 B1 | 4/2017 |
| GB | 191016136 A | 3/1911 |
| JP | 10235032 | 9/1998 |
| KR | 200240158 | 10/2001 |
| WO | WO 02083375 A1 | 10/2002 |

* cited by examiner

GRIPPING HAND TOOLS

CROSS-REFERENCE TO RELATED PATENT APPLICATIONS

The present application is a continuation of U.S. patent application Ser. No. 16/745,042, filed on Jan. 16, 2020, which is a continuation of International Application No. PCT/US2020/013692, filed on Jan. 15, 2020, which claims the benefit of and priority to U.S. Provisional Application No. 62/793,276 filed on Jan. 16, 2019, which are incorporated herein by reference in their entireties.

BACKGROUND OF THE INVENTION

The present invention relates generally to the field of pliers and wrenches. Pliers typically include two plier members connected through a pivot that allows the upper handle to move a lower jaw and a lower handle to move an upper jaw about the pivot. Pipe wrenches typically include a head with a first set of teeth coupled to a hook jaw with a second set of teeth. Rotation of a thumbwheel moves the first set of teeth relative to the second set of teeth.

SUMMARY OF THE INVENTION

One embodiment of the invention relates to a pair of electricians pliers. The pliers include a first body with an upper handle, a lower jaw coupled to the upper handle, and a first pivot body located between the upper handle and the lower jaw. The pliers include a second body with a lower handle, an upper jaw coupled to the lower handle, and a second pivot body located between the lower handle and the upper jaw. A pivot is formed between the first pivot body and the second pivot body such that the upper jaw pivots relative to the lower jaw about a pivot axis of the pivot. An inner surface of the first pivot body and an inner surface of the second pivot body define a finger hole that receives a user's finger. The pivot axis is at least partially surrounded by the inner surfaces of the first and second pivot bodies such that the pivot axis is located in the finger hole.

Another embodiment of the invention relates to high leverage pliers. The high leverage pliers include an upper jaw, a lower jaw, an upper handle coupled to the lower jaw, and a lower handle coupled to the upper jaw. A low leverage pivot has a low leverage pin and a low level pivot opening and a high leverage pivot has a high leverage pin and a high level pivot opening. A selector switch allows a user to select between the low leverage pivot and the high leverage pivot by selecting a rotational pivot about either the low leverage pivot or the high leverage pivot. When the low leverage pin passes through the low level pivot opening a low leverage pivot is formed and when the high leverage pin passes through the high leverage opening the rotational pivot is formed about the high leverage pivot.

Another embodiment of the invention relates to a pipe wrench that has a handle, a head located on an end of the handle and that forms an aperture. A lower jaw with teeth is coupled to the head. A thumbwheel is located in the aperture and a V-shaped hook jaw has a first set teeth having tips lying in a first engagement plane and a second set of teeth having tips lying in a second engagement plane. The first engagement plane is oriented at a non-zero angle relative to the second engagement plane and the hook jaw is threadedly coupled to the thumbwheel and extends through the aperture of the head such that rotating the thumbwheel moves the hook jaw relative to the lower jaw on the head.

Another embodiment of the invention relates to pipe wrenches. Pipe wrenches can include a body having a head forming a lower jaw and a handle. A first set of teeth is coupled to the head to cooperate with a second set of teeth coupled to a hook jaw to grip and rotate a workpiece (e.g., a pipe). The head includes an aperture that receives the hook jaw. A thumbwheel captured between the body and aperture of the pipe wrench is threadedly coupled to the hook jaw such that rotating the thumbwheel moves the hook jaw relative to the lower jaw on the head. Applicant has found that using a V-shaped hook jaw and/or lower jaw increases the gripping force the jaws exert on a workpiece. In addition, use of the pivotable lower jaw reduces the working area between the hook jaw and pivotable lower jaw. The rotation of the pivotable lower jaw increases the compressive forces on the workpiece and increasing the frictional gripping force between the jaws and the workpiece. In some embodiments, the teeth of the hook jaw and/or lower jaw may be coupled and/or formed from carbide steel and/or diamond grit.

Another embodiment of the invention relates to pliers with a front cutout (e.g., lineman's pliers). The pliers may include a front cutout with axial teeth to grip two or more wires and provide grip in a rotational direction about the central axis of the wires. This configuration enables twisting the wires about one another to form an electrical contact. The front axial teeth and cutout may serve other purposes, such as facilitating the removal of stripped screws.

Another embodiment of the invention relates to selectable high-leverage pliers. Traditional pliers have a 1:1 relationship between handle position and jaw position. High-leverage pliers require more handle movement to achieve the same jaw movement. For example, high-leverage pliers may have a 2:1 relationship, such that opening the handles 30° opens the jaws 15°. Traditional pliers (e.g., with a 1:1 relationship) allow the jaws to open a larger distance (e.g., have a greater working area). High-leverage pliers use mechanical advantage to provide greater compressive force relative to the force applied at the handles. Selectable high-leverage pliers allow a user to select a leverage ratio between two or more ratios.

Another embodiment of the invention relates to a pair of pliers. The pliers have an upper handle with a finger hole and a lower jaw and a lower handle with a finger hole and an upper jaw. A finger hole pivot is formed between the upper handle and the lower handle at the finger holes of the upper handle and the lower handle. The upper jaw pivots relative to the lower jaw about the finger hole pivot that is configured to receive a finger of a user to grip the finger hole pivot and extend a finger through the finger hole.

Alternative exemplary embodiments relate to other features and combinations of features as may be generally recited.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
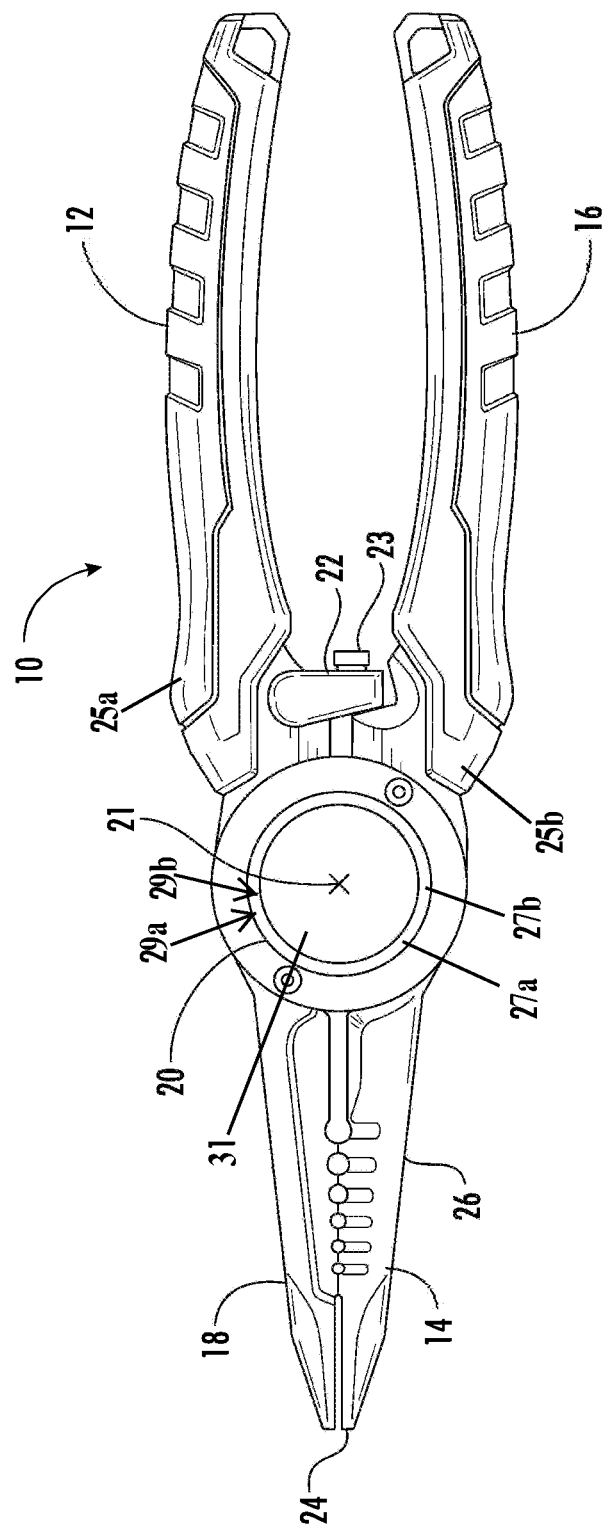
FIG. 1 shows a top view of a pair of electrician's pliers with a finger hole pivot, according to an exemplary embodiment.

Referring generally to the figures, various embodiments of pliers and wrenches are shown. Pliers include wire cutters, lineman's pliers, and selectable high-leverage pliers. Pliers include a first handle and a first jaw pivotably coupled to a second handle and a second jaw through a first pivot. The pliers include opposing workpiece engagement planes on the first and second jaw. In general, in the embodiments described herein, at least one of the workpiece engagement planes is movably coupled to the associated jaw element allowing relative movement between the workpiece engagement plane and the jaw.

Pipe wrenches include a body having a head and a handle. A first set of teeth is coupled (e.g., selectively coupled or fixedly coupled) to the head. The head includes an aperture sized to slidably receive a hook jaw coupled to a second set of teeth (selectively coupled or fixedly coupled). Rotating a thumbwheel that is threadedly coupled to the hook jaw, the second set of teeth move relative to the first set of teeth to cooperate and grip an object, such as a pipe.

Applicant has found that replacing a traditional pivot of the handles and jaws of wire cutters improves the ability to grip and rotate the wire cutters. For example, providing a finger hole pivot in wire cutters enables a user to rotate the wire cutters and strip the sheath off wires efficiently. Similarly, providing V-shaped jaws on pipe wrenches improves the gripping force of pipe wrenches on a workpiece by distributing the frictional load through a greater number of teeth. Pivotable jaws pivot to reduce the area between jaws when the wrench is rotated, thus increasing the compression and frictional forces on the workpiece. This increased frictional force reduces slipping of the workpiece in the wrench as the wrench is rotated. Applicant has found that the use of carbide and/or diamond grit teeth improves the durability and wear performance of various pipe wrenches and pliers.

Pliers may include axial teeth to provide another gripping direction. For example, axial teeth can grip parallel wires and enhance twisting wires together about the central axis of the pliers. Axial teeth provide enhanced grip in alternative directions and may provide other benefits.

Conventional pliers have a 1:1 rotational relationship between handle movement and jaw movement. For example, each degree the handles move (in an opening or closing direction), the jaws move one degree. This ratio allows the jaws to open fully when the handles are fully open but provides no mechanical advantage for compressing the jaws on a workpiece. Applicant has found that by using a leveraged motion, greater compressive forces can be applied to a workpiece. For example, configuring a pivot location so that the handles move two degrees for every degree the jaws move, uses mechanical advantage to increase the clamping force of the jaws. Applicant has found that by allowing a user to select the ratio of movement between the handles and the jaws, a user can selectively choose the leverage based on the application of the pliers. For example, the user can select a lower (e.g., relatively equal) ratio to maximize the distance between the jaws of the pliers. Alternatively, a user can select a higher ratio to maximize the compressive force generated at the jaws.

FIG. 1 shows a top view of a pair of electrician's pliers 10 (e.g., 6-in-1 electrician's pliers). Pliers 10 include an upper handle 12 coupled to a lower jaw 14 and a lower handle 16 coupled to an upper jaw 18. A finger hole pivot 20 couples upper handle 12 and lower jaw 14 to lower handle 16 and upper jaw 18. Pliers 10 also include a locking mechanism 22, needle-nose gripping tips 24, and wire strippers 26. Needle-nose gripping tips 24 may be used to apply pressure in narrow spaces or bend a wire in a desired direction. The wire strippers 26 are configured to house several different gauges of wires within the jaws 14 and 18 to strip the sheath (e.g., plastic) surrounding the wire (e.g., copper) to create electrical contacts, for example, to an adjacent wire. In some embodiments, needle-nose gripping tips 24 form a taper from finger hole pivot 20. For example, a thickness or width of pliers 10 as measured along a pivot axis 21 (FIG. 6) at finger hole pivot 20 is greater than a thickness of pliers 10 at needle-nose gripping tips 24. Pivot axis 21 is defined as the axis 21 about which the upper and lower handles 12 and 16 and upper and lower jaws 14 and 18 rotate. In some embodiments, different parts of pliers 10 may include different materials or composites of materials. For example, upper and lower handles 12 and 16 and upper and lower jaws 14 and 18 comprise a carbide steel material and needle-nose gripping tips 24 comprise a diamond grit.

Wire strippers use a traditional pivot to couple upper handle 12 and lower jaw 14 to lower handle 16 and upper jaw 18. Finger hole pivot 20 permits the user's finger to pass through finger hole pivot 20 of pliers 10, enhancing the grip on pliers 10 when rotating and stripping wire. This ratio allows upper handle 12 and lower handle 16 to rest in the operator's palm. This configuration facilitates the wire stripping function of pliers 10. In addition, pliers 10 can be spun or rotated about the wire (e.g., 90° in both directions) to cut the plastic sheath surrounding the wire. Finger hole pivot 20 allows the operator to grip pliers 10 through the hole while exerting pressure from the palm to the handles 12 and 16 to strip the sheath surrounding the wire.

In some embodiments, pliers 10 may have a spring 23 (e.g., under locking mechanism 22) that biases handles 12 and 16 and/or jaws 14 and 18 to an open position. In this configuration, an operator may use locking mechanism 22 to lock and rotate pliers 10 about a wire. In some embodiments, the spring may bias the handles towards a closed position to facilitate rotation of pliers 10 about a wire. For example, locking mechanism 22 locks upper and lower handles 12 and 16 relative to each other such that lower and upper jaws 14 and 18 are locked (e.g., in a locked position) and/or are adjacent to one another. Similarly, spring 23 biases upper handle 12 away from lower handle 16 such that lower and upper jaws 14 and 18 pivot to an open position relative to each other.

In some embodiments, pliers 10 have first and second bodies 25a and 25b. First body 25a has upper handle 12, lower jaw 18 which is coupled to upper handle 12 and a first pivot body 27*a* located between upper handle 12 and lower jaw 18. Second body 25*b* has lower handle 16, upper jaw 18 coupled to lower handle 16 and a second pivot body 27*b* located between lower handle 16 and upper jaw 18. Pivot 20 is formed between first and second pivot bodies 25, such that upper jaw 18 pivots relative to lower jaw 14 about a pivot axis 21 of pivot 20. An inner surface 29*a* of first pivot body 27*a* and an inner surface 29*b* of second pivot body 27*b* define a finger hole 31 that receives a user's finger, for example, to grip pliers 10 while stripping a wire. In some embodiments, pivot axis 21 is surrounded, or partially surrounded by inner surfaces 29 of first and/or second pivot bodies 27 such that pivot axis 21 is located in finger hole 31. As illustrated in the embodiment of FIG. 1, inner surfaces 29 of first and second pivot bodies 27 are curved surfaces, such that when lower and upper jaws 14 and 18 are in a closed position (as illustrated), inner surfaces 29 define a circle that defines the outer perimeter of finger hole 31.

Figure 2:
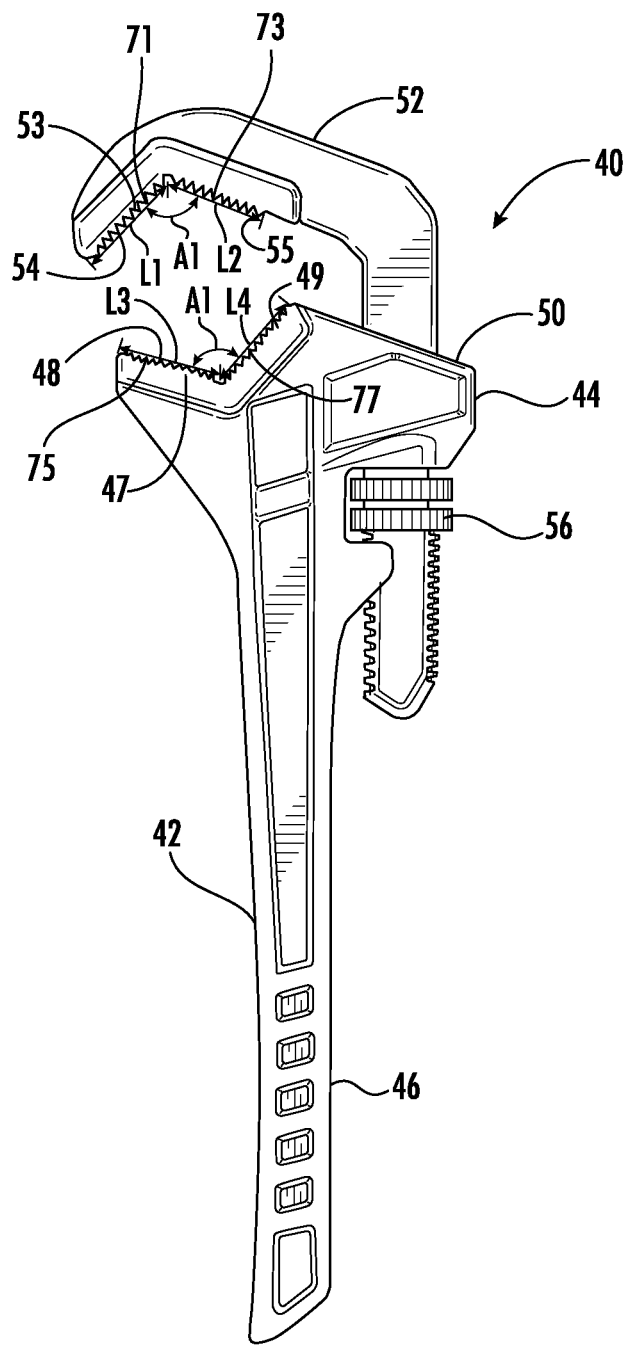
FIG. 2 shows a pipe wrench with a maximized V-grip head and jaw, according to an exemplary embodiment.

FIG. 2 illustrates a pipe wrench 40 according to one embodiment. The pipe wrench 40 includes a body 42 having a head 44 and a handle 46. A first or lower jaw 48 forms a V-shape and is coupled (e.g., selectively coupled or fixedly coupled) to head 44. Head 44 includes an aperture 50 sized to slidably receive a second or hook jaw 52 forming an upper V-shaped jaw 54. By rotating a thumbwheel 56, which is threadedly coupled to hook jaw 52, hook jaw 52 moves relative to lower jaw 48. In this way, lower jaw 48 cooperates to move relative to the upper V-shaped jaw 54 to grip an object (e.g., a pipe). Lower jaw 48 is formed on head 44 in a V-shape with a front set of teeth 47 and a rear set of teeth 49. Similarly, the upper V-shaped jaw 54 forms a front set of teeth 53 that are offset from a rear set of teeth 55.

V-shaped hook jaw 54 includes first and second engagement planes 71 and 73. In some embodiments, V-shaped hook jaw 54 includes additional planar surfaces. Each engagement plane (e.g., 71 or 73) has its own teeth. In the embodiment shown, first engagement plane 71 is approximately the same size as the second engagement plane 73.

Figure 4:
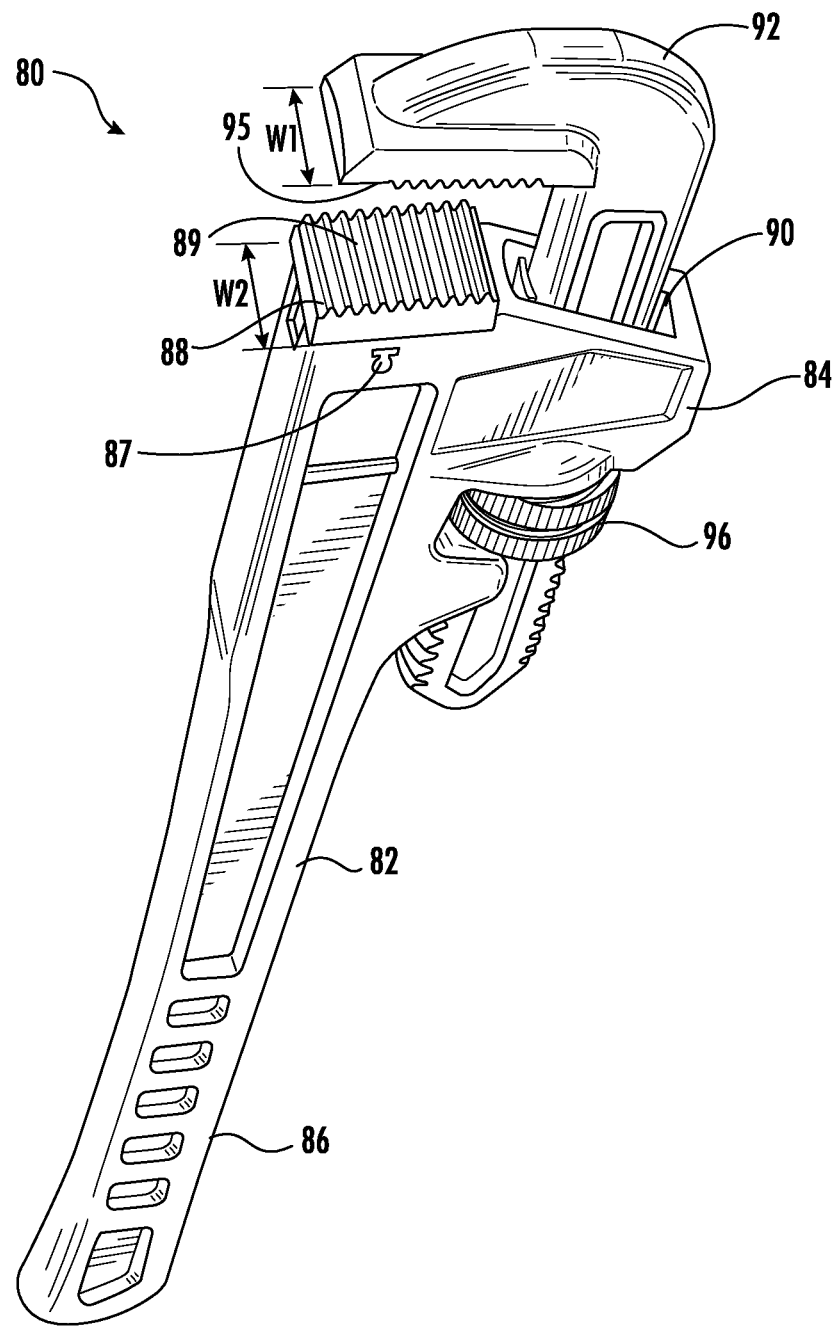
FIG. 4 shows a pipe wrench with carbide steel teeth, according to an exemplary embodiment.

In various embodiments, a width W1 of first engagement plane 71 is within ±10% of a width W2 of the second engagement plane 73, specifically, width W1 is within ±5% of width W2. (FIG. 4). Similarly, a length L1 of first engagement plane 71 is within ±10% a length L2 of second engagement plane 73, specifically, length L1 is within ±5% of length L2. Engagement planes 71 and 73 are oriented at a non-zero angle relative to one another. Applicant has found that by using similarly sized engagement planes 71 and 73 oriented at an angle, hook jaw 25 and lower jaw 48 surround more of the pipe, which results in teeth 47, 49, 53, and 55 more evenly distributing frictional loads as wrench 40 is moved relative to the pipe.

In some embodiments, pipe wrench 40 has a V-shaped configuration on both the head 44 and hook jaw 52. For example, hook jaw 54 includes first and second engagement planes 71 and 73 and lower jaw includes similar third and fourth engagement planes 75 and 77. The front sets of teeth 47 and 53 create an oblong or orthogonal angle A1 with the rear sets of teeth 49 and 55. For example, the front sets of teeth 47 and 53 (and/or engagement planes 71 and 73 or 75 and 77) may form an angle of less than 90°, 100°, 110°, 120°, 130°, 135°, 140°, 150°, 160°, or 170°. First and second engagement planes 71 and 73 of hook jaw 52 include sets of teeth 53 and 55 that have tips that lying in the engagement planes 71 and 73. In some embodiments, engagement planes 71 and/or 75 are oriented at a non-zero angles relative to engagement planes 73 and/or 77 respectively.

In one embodiment, lower jaw 48 does not include front set of teeth 47. In this configuration, lower jaw 48 forms a line or curve along head 44 of pipe wrench 40. When a force is applied to handle 46, a torque is applied to a workpiece captured between lower jaw 48 and V-shaped jaw 54 of hook jaw 52. In some embodiments, only the rear set of teeth 49 on lower jaw 48 engage the workpiece. For example, due to the movement of the V-shaped jaw 54 or the compressive force applied to lower jaw 48 when pipe wrench 40 is rotated in a clockwise direction, oriented as illustrated in FIG. 2, the rear set of teeth 49 engage the workpiece as the handle 46 is rotated. In some embodiments, the forward set of teeth 47 on lower jaw 48 may be eliminated to enlarge the working area between lower jaw 48 and hook jaw 52 and provide the operator more freedom to engage or disengage the workpiece with pipe wrench 40. The working area is the area between lower jaw 48 and V-shaped jaw 54.

Figure 3:
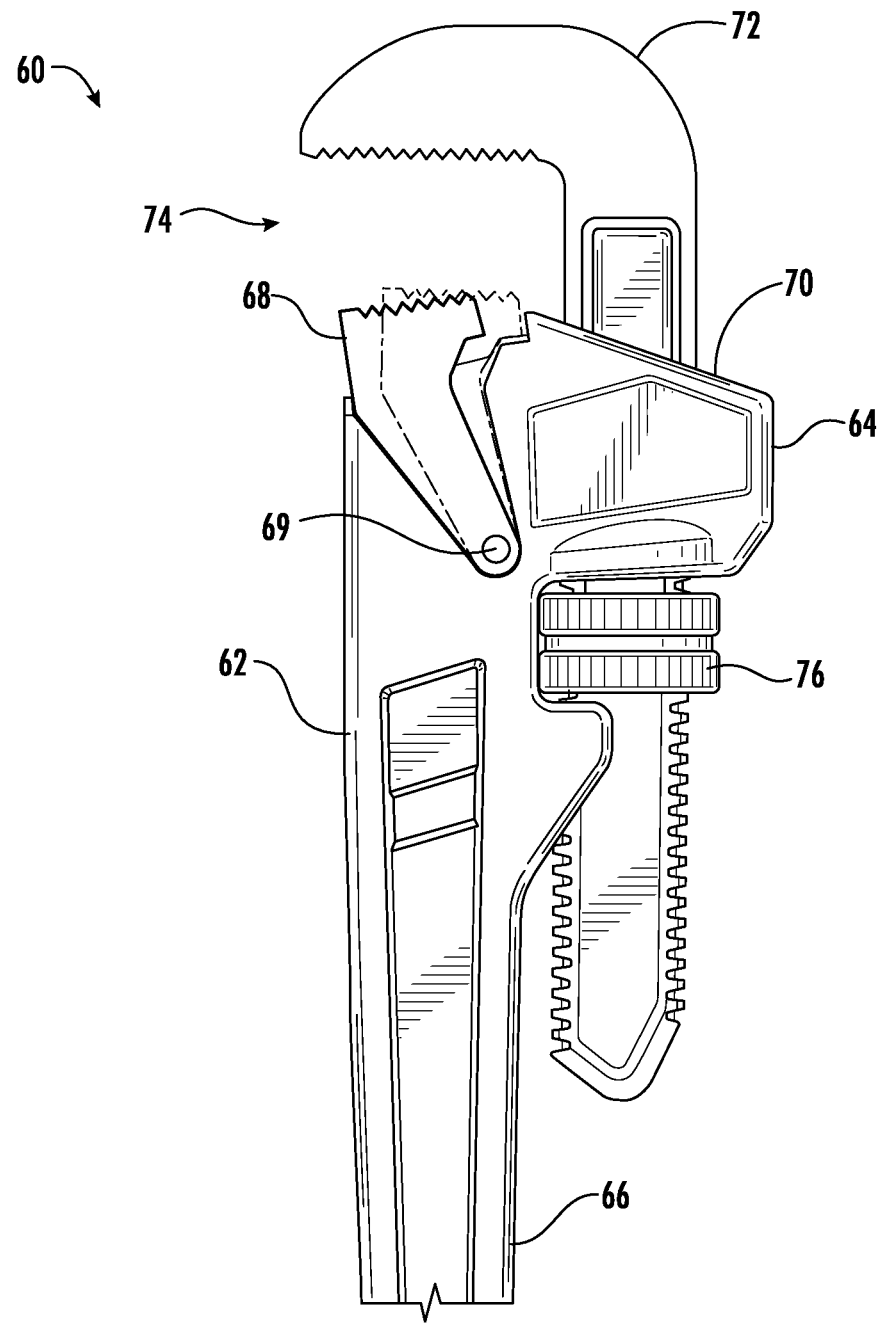
FIG. 3 shows a pipe wrench with a pivotable lower jaw, according to an exemplary embodiment.

FIG. 3 shows a pipe wrench 60 with a pivotable lower jaw 68, according to another embodiment. For example, lower jaw 68 is coupled to head 64 by a pivot point 69, such that lower jaw 68 rotates about pivot 69 located in head 64. Pipe wrench 60 may have a V-shaped lower jaw 48 and/or an upper V-shaped jaw 54, as described with reference to FIG. 2. Pipe wrench 60 includes a body 62 having a head 64 and a handle 66. Pivotable lower jaw 68 rotates about a pivot point 69 located on the head 64 and/or body 62 of pipe wrench 60. An aperture 70 located on head 64 is sized to slidably and/or threadedly receive a hook jaw 72. Hook jaw 72 moves relative to pivotable lower jaw 68 when a thumbwheel 76 is rotated, threadedly engaging, and moving hook jaw 72 relative to pivotable lower jaw 68. Working area 74 is the area between the teeth on hook jaw 72 and the teeth on pivotable lower jaw 68. Pivotable lower jaw 68 reduces working area 74 as pipe wrench 60 is rotated about a workpiece.

Pivotable lower jaw 68 pivots to increase the gripping force on a workpiece captured between hook jaw 52 and pivotable lower jaw 68. As illustrated in FIG. 3, when pivotable lower jaw 68 rotates from a forward position to a rearward position (shown in outline), working area 74 between hook jaw 72 and pivotable lower jaw 68 decreases. This movement increases the pressure pivotable lower jaw 68 exerts on the workpiece. The resulting increased friction on the workpiece reduces slipping as the pipe wrench is rotated. Thus, pipe wrench 60 can apply a greater torque on the workpiece without slipping.

In some embodiments, as pivotable lower jaw 68 rotates, the upper hook jaw 72 also moves as hook jaw 72 shifts within aperture 70. This motion further increases the grip of pivotable lower jaw 68 and hook jaw 72 on the workpiece by maximizing the area of the workpiece in contact with the teeth on hook jaw 72. Working area 74 between pivotable lower jaw 68 and hook jaw 72 decreases as torque is applied to the workpiece because pivotable lower jaw 68 decreases working area 74 more significantly than the shift of hook jaw 72 within aperture 70. As such, the compressive force exerted on the workpiece is increased as pipe wrench 60 applies torque and reduces working area 74. The increased compressive force increases the friction on the workpiece and reduces slipping as pipe wrench 60 is rotated.

FIG. 4 shows a pipe wrench 80 with carbide steel teeth to increase the hardness and durability of the teeth, according to another embodiment. Pipe wrench 80 is substantially the same as or similar to pipe wrench 40 and 60 as described above except for the differences described. In contrast to the design of pipe wrench 40 and 60, lower jaw 88 and/or hook jaw 92 comprise, and/or are coupled to carbide teeth. Pliers 10, discussed above, and/or lineman's pliers 120 or selectable high-leverage pliers 140, discussed in greater detail below with reference to FIGS. 6-10, may also be fitted with carbide teeth.

In some embodiments, pipe wrench 80 may have a V-shaped lower jaw 48 and/or hook jaw 52, as described in reference to FIG. 2. In some embodiments, pipe wrench 80 may have a pivotable lower jaw 68, as described in reference to FIG. 3. Pipe wrench 80 includes a body 82 having a head 84 and a handle 86. A lower jaw 88 includes a first set of teeth 89. An aperture 90 located on head 84 is sized to slidably and/or threadedly receive a hook jaw 92 with a second set of teeth 95. The hook jaw 92 moves relative to lower jaw 88 when a thumbwheel 96 is rotated, threadedly engaging and moving the hook jaw 92 relative to lower jaw 88. Carbide steel teeth 89 and 95 may include laser-welded carbide blades on the lower jaw 68 and hook jaw 92. In some instances, carbide teeth 89 and 95 are replaceable. For example, a user may replace carbide teeth 89 and 95 without replacing pipe wrench 80. A pin 87 may connect lower jaw 88 to head 84 of pipe wrench 80 to facilitate rotation and/or replacement of lower jaw 88.

Figure 5:
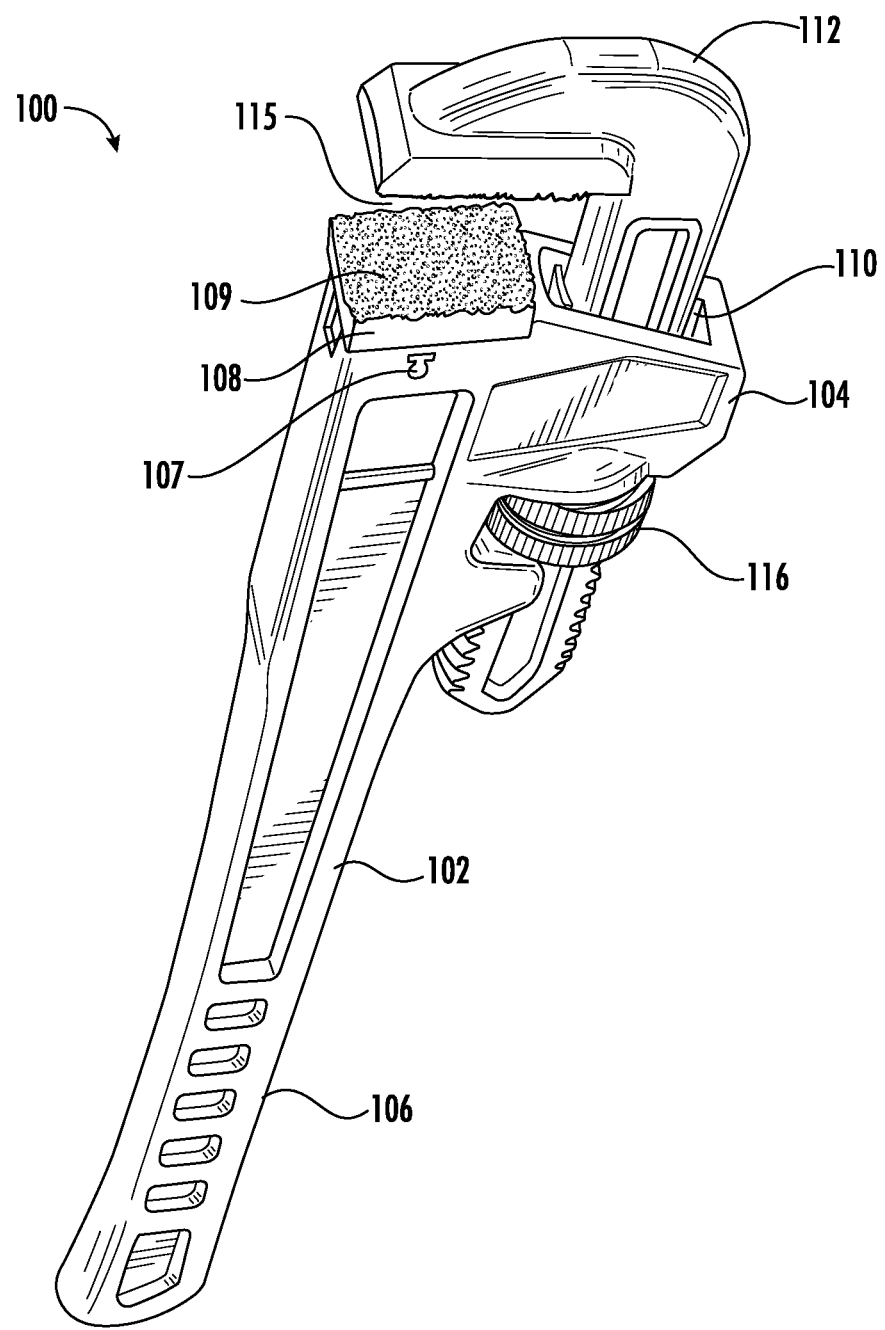
FIG. 5 shows a pipe wrench with diamond grit teeth, according to an exemplary embodiment.

FIG. 5 shows a pipe wrench 100 with diamond grit teeth to increase the hardness and durability of the teeth, according to another embodiment. Pipe wrench 100 is substantially the same as or similar to pipe wrench 40, 60, and 80 as described above except for the differences described. In contrast to the design of pipe wrenches 40, 60, and 80, lower jaw 108 and hook jaw 112 comprise, and/or are coupled to, diamond grit teeth. Pliers 10, discussed above, and/or lineman's pliers 120 or selectable high-leverage pliers 140, discussed in greater detail below with reference to FIGS. 6-10, may also be fitted with diamond grit teeth.

In some embodiments, pipe wrench 100 may have a V-shaped lower jaw 48 and/or hook jaw 52, as described in reference to FIG. 2. In some embodiments, pipe wrench 100 may have a pivotable lower jaw 68, as described in reference to FIG. 3. Pipe wrench 100 includes a body 102 having a head 104 and a handle 106. A lower jaw 108 includes a first set of teeth 109. An aperture 110 located on head 104 is sized to slidably and/or threadedly receive a hook jaw 112 with a second set of teeth 115. The hook jaw 112 moves relative to lower jaw 108 when a thumbwheel 116 is rotated, threadedly engaging and moving the hook jaw 112 relative to lower jaw 108.

In some embodiments, diamond grit is provided to a surface of lower jaw 108 and/or hook jaw 112. The engagement planes of lower jaw 108 and hook jaw 112 may have a checkered or milled surface. For example, the surface may be clad with a carbide material (e.g., as described with reference to pipe wrench 80) and then milled to create the checkered pattern. This process may result in pyramids of carbide and/or diamond grit on a steel base or frame.

Figure 6:
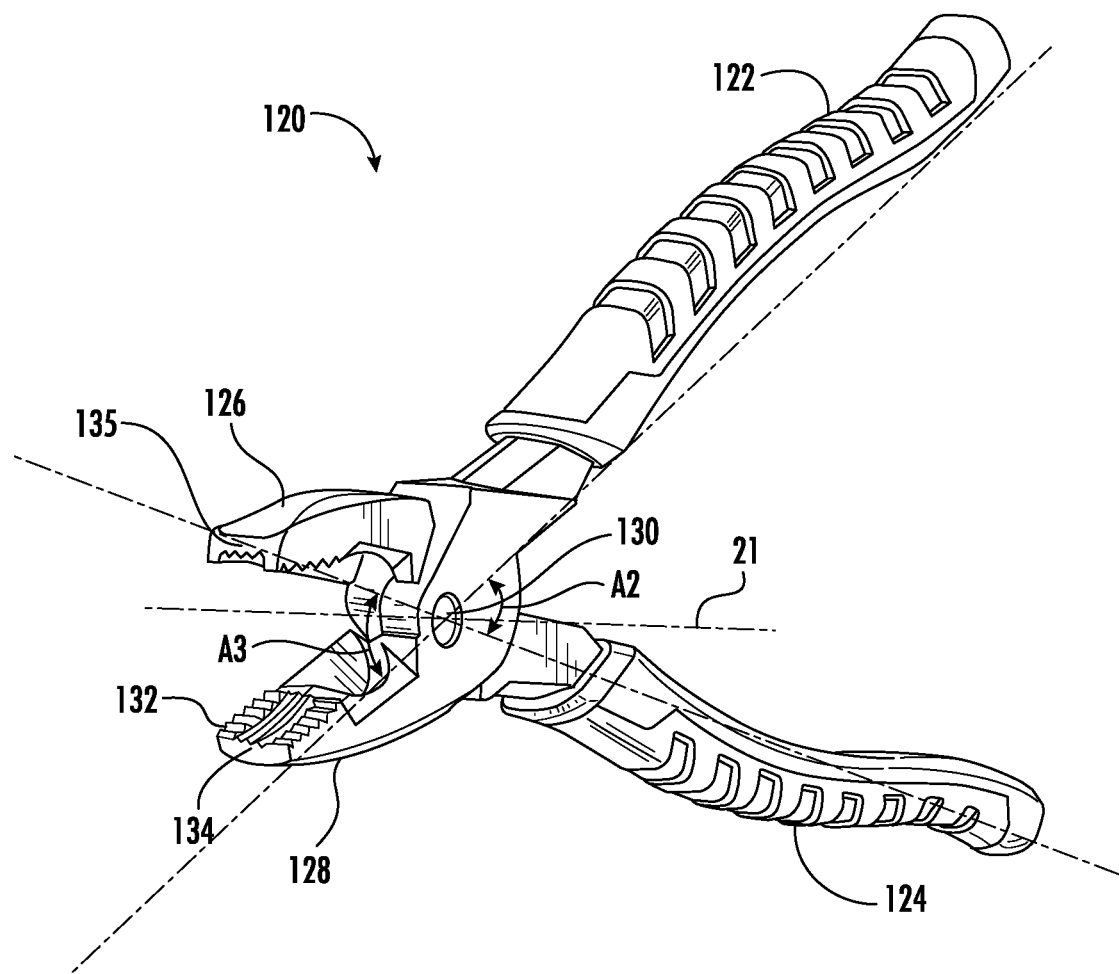
FIG. 6 shows lineman's plies with a front cutout for axial teeth, according to another embodiment.

FIG. 6 shows a pair of lineman's pliers 120, according to an exemplary embodiment. Pliers 120 include an upper handle 122, a lower handle 124, an upper jaw 126, and a lower jaw 128. Upper handle 122 and lower jaw 128 are coupled to lower handle 124 and upper jaw 126 at a pivot 130. Pliers 120 include horizontal teeth 132 and a front cutout 135 for axial teeth 134. Lineman's pliers 120 may be used in a variety of circumstances, including to twist wires together. Axial teeth 134 facilitate twisting multiple wires together with front axial teeth 134 providing the front cutout 135 with teeth 134 to grip two or more wires. As handles 122 and 124 are rotated, jaws 126 and 128 grip the wires in a rotational direction around the central axis of the pliers 120. The gripping force causes the wires to twist about one another. For example, the wires may be generally parallel with handles 122 and 124 in a closed position. The front axial teeth 134 provide an area in front of cutout 135 that prevents the wires from being crushed when jaws 126 and 128 are closed. Axial teeth 134 design configuration may be useful in other circumstances, e.g., to remove screws that have had the heads stripped.

FIGS. 7-10 illustrate a pair of selectable high-leverage pliers 140, according to an exemplary embodiment. Selectable high-leverage pliers 140 are capable of selectively operating in one of two modes to change the leverage of the pliers 140. Traditional pliers 140 have a direct 1:1 rotational relationship between the handle position (e.g., upper handle 142 relative to lower handle 144) and the jaw position (e.g., upper jaw 146 relative to lower jaw 148). Such pliers with a 1:1 ratio move jaws 146 and 148 an equal rotational distance as input at handles 142 and/or 144. For example, if handles 142 and/or 144 of conventional pliers (with a 1:1 rotational relationship) are opened 20°, jaws 146 and 148 also open 20°. High-leverage pliers 140 (e.g., with a 2:1 rotational relationship ratio) do not have a direct rotational relationship between the handle position and the jaw position. As such, high-leverage pliers 140 require more handle movement to achieve the same jaw movement when compared to traditional pliers 140 (e.g., with a 1:1 relationship). For example, opening handles 142 and 144 of high-leverage pliers 140 with a 2:1 rotational relationship by 30° only opens the jaws 15° (e.g., upper jaw 146 and lower jaw 148). As such, pliers 140 with a direct 1:1 rotational relationship between handle 142, 144 and jaw 146, 148 positions may allow jaws 146, 148 to open wider than high-leverage pliers 140, thus creating a larger working area. As described above with reference to FIG. 3, the working area is defined as the distance between upper jaw 146 and lower jaw 148 available to grasp a workpiece. Specifically, the working area is defined as the area between the teeth of upper and lower jaws 146 and 148.

High-leverage pliers 140 may have a rotational ratio of 1.25:1, 1.5:1, 1.75:1, 2:1, 2.5:1, 3:1, 3.5:1, 4:1, 5:1 or more. For example, a high-leverage plier 140 with a 2:1 ratio means that for every 2° of movement of upper handle 142 relative to lower handle 144, upper jaw 146 moves 1° relative to lower jaw 148. Similarly, a 1.5:1 ratio means that for every 1.5° of movement at handles 142, 144; jaws 146, 148 move 1°. Similar factors apply for the other ratios. Thus, high-leverage pliers 140 provide greater compressive forces and conventional 1:1 pliers 140 provide greater working areas. In some embodiments, the increased compressive force is a direct multiple of the leverage ratio of high-leverage pliers 140. A user may want an increased compressive force for one application and a greater working area for another. For example, during a job, the user may find it preferable to have the larger working area of conventional (e.g., 1:1) pliers 140 for a specific application and later find it preferable to have a greater compressive force (e.g., as applied by 2:1 pliers). A user may often need to switch between lower ratio and higher ratio pliers 140. Applicant has found that providing a selector switch 150 enables the user to select various ratios during the operation of the selectable high-leverage pliers 140.

In conventional pliers, upper handle 142 and lower jaw 148 are part of the same integral piece. High-leverage pliers 140 couple lower jaw 148 to upper handle 142 via a mechanical linkage. The mechanical linkage translates the movement of handles 142 and 144 into a smaller movement in jaws 146 and 148, creating the high-leverage ratio.

Selectable high-leverage pliers 140 have a selector switch 150 that allows the user to switch between high-leverage pliers 140 (e.g., with a 2.5:1 ratio) and traditional pliers 140 with a 1:1 ratio, easily. In some embodiments, pliers 140 include multiple selectable ratios. For example, selector switch 150 selects or changes a rotational pivot or pivot axis 21 of upper handle 142 relative to lower handle 144. Selector switch 150 has a low leverage pin 154 associated with a low leverage opening or pivot 166 and a high leverage pin 152 associated with a high leverage pivot 158. When selector switch 150 selects rotational pivot axis 21 to be about low leverage pivot 158, low leverage pin 154 passes through low leverage pivot 166. Similarly, when selector switch 150 selects rotational pivot axis 21 to rotate about high leverage pivot 158, high leverage pin 152 passes through high leverage pivot 158.

Figure 7:
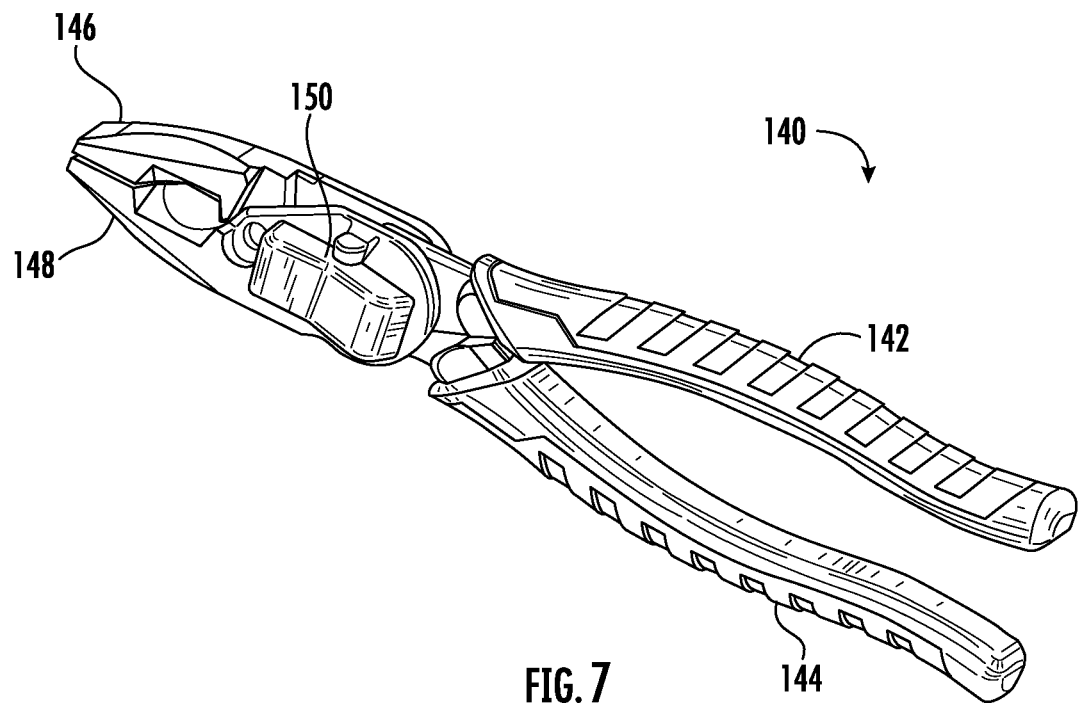
FIG. 7 shows a perspective view of selectable high-leverage pliers with a selector switch, according to an exemplary embodiment.
Figure 8:
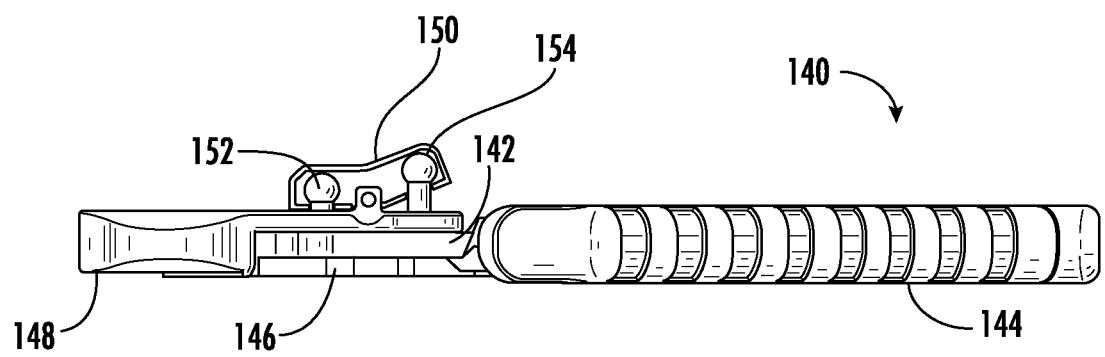
FIG. 8 shows a side view of the selectable high-leverage pliers of FIG. 7, according to one embodiment.

Referring to FIGS. 7 and 8, pliers 140 are shown in the high-leverage position. High-leverage pin 152 is depressed and passes through lower jaw 148, upper handle 142, and upper jaw 146. Low leverage pin 154 (e.g., traditional pin) is elevated and passes through only lower jaw 148. High-leverage pin 152 is longer than low leverage pin 154. In other words, selector switch 150 has pushed high-leverage pin 152 through high-leverage pinhole or pivot 158, so that high-leverage pin 152 rotates through a high-leverage opening or slot 156. In this configuration, handles 142 and 144 translate jaws 146 and 148 by the selected ratio.

Figure 9:
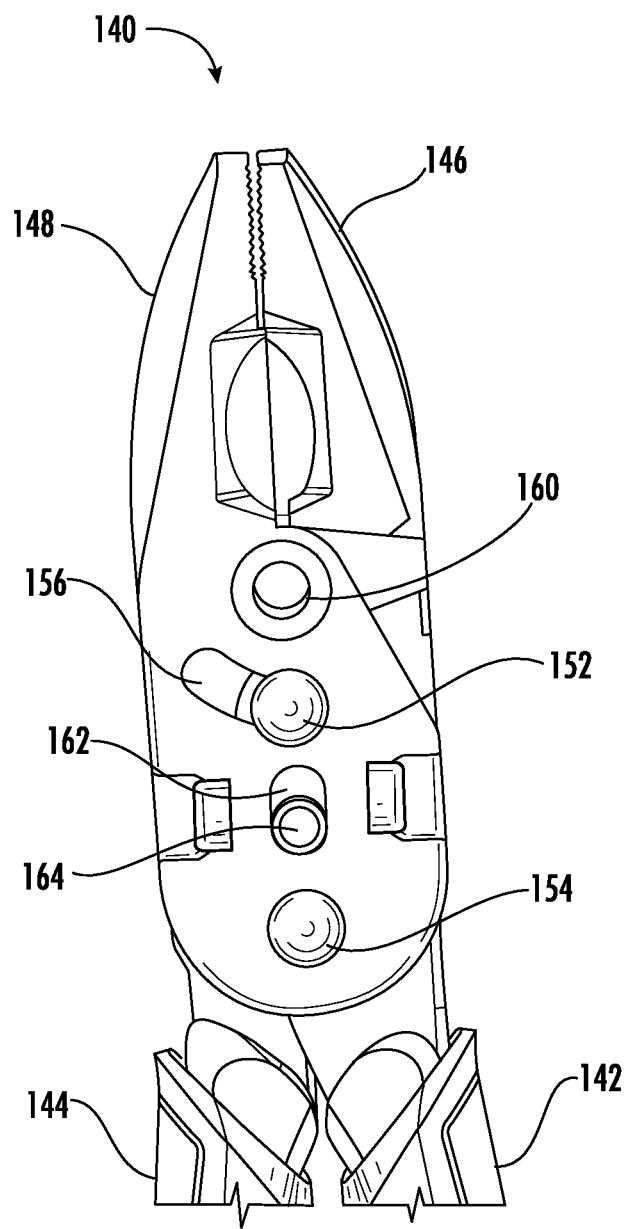
FIG. 9 shows a top view of the head of the selectable high-leverage pliers of FIG. 7 with the selector switch removed, according to an exemplary embodiment.

When selector switch 150 is reversed (e.g., when low leverage pin 154 is depressed), the high-leverage pin 152 is elevated and passes through only lower jaw 148. Low leverage pin 154 is depressed and passes through upper handle 142 and lower jaw 148. In this position, lower jaw 148 and upper handle 142 are coupled together such that they do not move with respect to one another. FIG. 9 shows a top view of the high-leverage pin 152 and low leverage pin 154 with selector switch 150 removed. Center arm 164 does not move in center slot 162 of lower jaw 148. Low leverage pin 154 prevents upper handle 142 from moving with respect to lower jaw 148. Rather, upper handle 142 and lower jaw 148 are joined together and pivot about jaw pivot 160.

The ratios determined by selection of high-leverage pin 152 and/or low leverage pin 154 can be selected from any of the leverage ratios previously described. In one example, low leverage pin 154 creates a 1:1 relationship between the handle movement and the jaw movement and the high-leverage pin creates a 2:1 relationship. Specifically, low leverage pivot 166 provides a 1:1 ratio such that movement of upper handle 142 relative to lower handle through an angle A2 (see e.g., FIG. 6) results in movement of upper jaw 146 relative to lower jaw 148 by the same angle A2. Similarly, high leverage pivot 158 provides a 2:1 ratio, such that movement of upper handle 142 relative to lower handle 144 through an angle A2 results in movement along angle A3 (see e.g., FIG. 6) of upper jaw 126 relative to lower jaw 128 by two times the angle A2.

In some embodiments, low leverage pin 154 creates a 1.5:1 relationship and the high-leverage pin creates a 3:1 relationship between the handle movement and the jaw movement. Other combinations and ratios may be designed. In addition, selector switch 150 may select more than two positions. For example, selector switch 150 may select a first ratio in a first position, a second ratio in a second position, a third ratio in a third position, a fourth ratio in a fourth position, and so forth. For example, a third leverage pin such as center arm 164 is the same as or similar to high leverage pin 152 and can be associated with a third leverage pivot or central slot 162, e.g., the same as or similar to pivot 158. In this case, selector switch 150 selects the rotational pivot axis 21 of handles 142 and 144 among low leverage pivot 166, high leverage pivot 158, and third leverage pivot or center arm 164. In some embodiments, third leverage pivot arm 164 has a leverage ratio that is greater than low leverage pivot 166 and less than high leverage pivot 158.

With reference to FIGS. 7-10, when selector switch 150 is in the high-leverage mode, lower jaw 148 and upper handle 142 move relative to one another. In this configuration, high-leverage pin 152 passes through the high-leverage pivot 158 (FIG. 10) in upper jaw 146 and high-leverage slot 156 in lower jaw 148. Upper handle 142 pivots relative to upper jaw 146 and lower handle 144 about high-leverage pin 152. When upper handle 142 is opened, the center arm 164 of upper handle 142 presses against the side of the center slot 162. Rotation about this point causes lower jaw 148 to pivot about the jaw pivot 160. As such, upper handle 142 pivots about high-leverage pin 152 and lower jaw 148 pivots about jaw pivot 160, creating a rotational ratio between the movement of handles 142, 144, and jaws 146, 148. As handles 142, 144 open and close, center arm 164 moves within center slot 162 and high-leverage pin 152 moves within the high-leverage slot 156.

Figure 10:
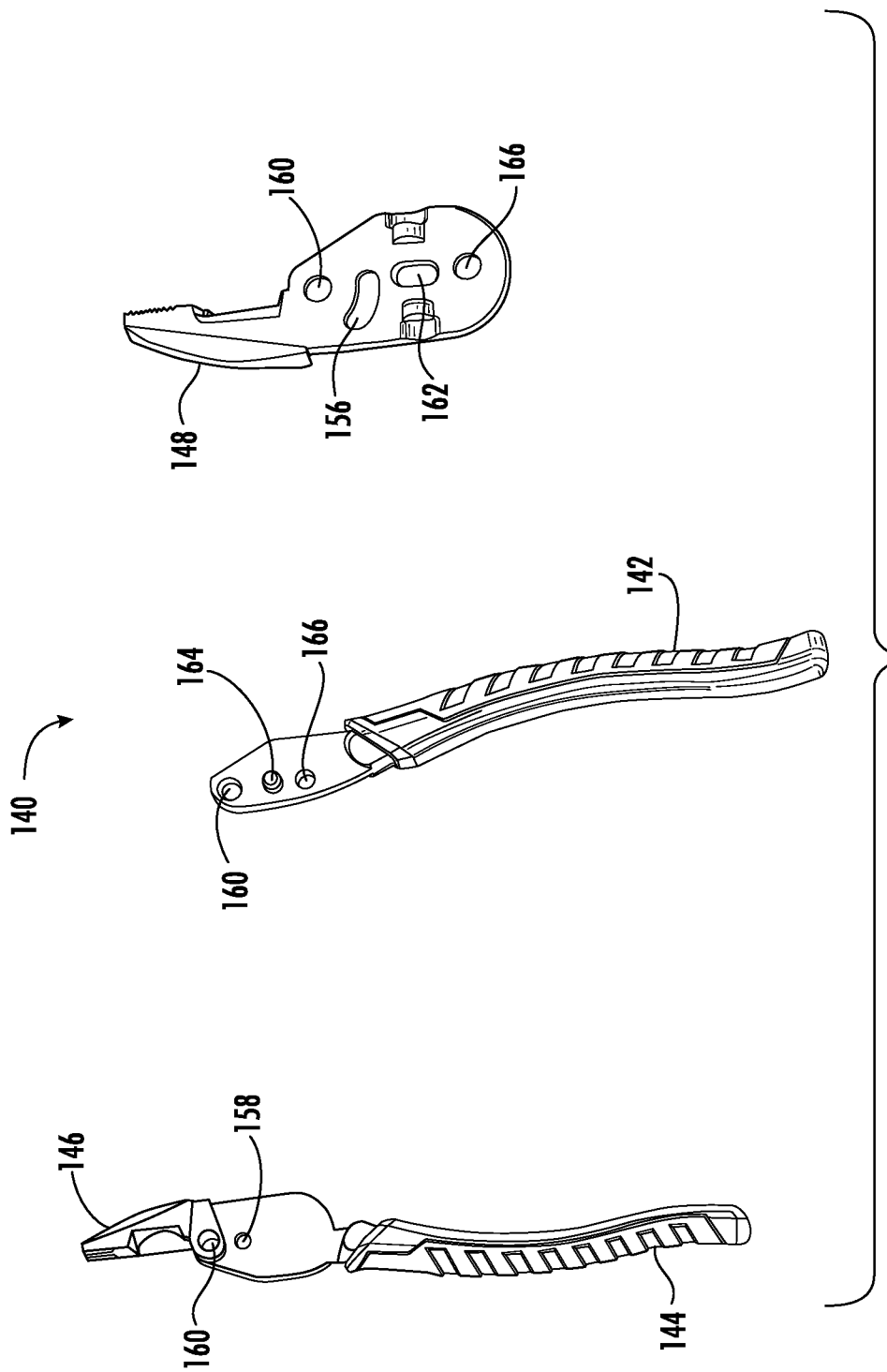
FIG. 10 shows an exploded view of the upper jaw and lower handle, the upper handle, and the lower jaw, of the selectable high-leverage pliers of FIG. 7, according to another embodiment.

FIG. 10 is an exploded view of the components of selectable high-leverage pliers 140, according to an exemplary embodiment. As shown, lower handle 144 and upper jaw 146 form an integral continuous piece. Lower handle 144 and upper jaw 146 piece includes a high-leverage pivot 158 for selectively receiving high-leverage pin 152. A jaw pivot fastens lower handle 144 upper jaw 146 to upper handle 142 and lower jaw 148.

As shown, upper handle 142 and lower jaw 148 are two separate pieces that are coupled together in various ways to create different ratios in handle movement relative to jaw movement. Upper handle 142 is joined to lower handle 144 upper jaw through the jaw pivot 160 and includes a center arm 164 and a second pinhole or low leverage pivot 166, configured to receive low leverage pin 154 selectively. In this configuration, when low leverage pivot 166 receives low leverage pin 154, upper handle 142 and lower jaw 148 are joined at both the jaw pivot 160 and the low leverage pivot 166 and move together as a single piece. As such, lower handle 144 and upper jaw 146 pivot about jaw pivot 160 with upper handle 142 and lower jaw 148 as though upper handle 142 and lower jaw 148 was a single continuous piece (e.g., a 1:1 ratio). As described above, alternative configurations for coupling upper handle 142 and lower jaw 148 may result in different rotational ratios.

Lower jaw 148 forms various selectable connections with lower handle 144 upper jaw 146 and upper handle 142 to create different rotational ratios between handles 142, 144 and jaws 146, 148. Lower jaw 148 includes a high-leverage slot 156 to receive high-leverage pin 152 which joins with high-leverage pivot 158 on lower handle 144 and/or upper jaw 146. When high-leverage pin 152 is depressed, high-leverage slot 156 allows translation of pin 152 through slot 156 to increase the compressive force on the workpiece. Center slot 162 receives center arm 164 on upper handle 142 and allows translation of center arm 164 through center slot 162. Low leverage pivot 166 may selectively receive low leverage pin 154 to join lower jaw 148 to upper handle 142. In some embodiments, the locations of the pivots relative to the jaws and/or handles defines whether the pivot is a high or low leverage pivot. For example, low leverage pin 154 passes through low leverage pivot 166 located between central arm 164 of selector switch 150 and either upper or lower handle 142 or 144. Similarly, high leverage pin 152 passes through opening or pivot 160 located between central arm 152 and either upper or lower jaw 142 or 144. In this configuration, the location of high and low leverage pins 152 and 154 relative to central pin 164 determines which pin 152 or 154 is high leverage relative to other pin 152 or 154.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions, and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. Pliers, comprising:
an upper jaw;
a lower jaw;
an upper handle coupled to the lower jaw;
a lower handle coupled to the upper jaw;
a first pivot axis;
a second pivot axis parallel to the first pivot axis; and
a selector that allows a user to select between a low leverage pivot or a high leverage pivot;
wherein, when the user selects the low leverage pivot, a low pivot pin is depressed and the lower jaw and the upper handle both pivot about the first pivot axis;
wherein, when the user selects the high leverage pivot, a high pivot pin is depressed and the lower jaw pivots about the first pivot axis and the upper handle pivots about the second pivot axis such that rotational movement of the upper handle relative to the lower handle through a first angle corresponds to rotational movement of the lower jaw relative to the upper jaw through a second angle; and
wherein the first angle is greater than the second angle.

2. The pliers of claim 1, wherein a ratio of the size of the first angle to the size of the second angle is greater than 1.25:1.

3. The pliers of claim 1, further comprising a third leverage pivot selectable by the user via the selector, wherein, when the user selects the third leverage pivot, the lower jaw pivots about the first axis and the upper handle pivots about a third pivot axis that is parallel to the first pivot axis.

4. The pliers of claim 1, wherein the selector is a selector switch.

5. The pliers of claim 1, wherein the high pivot pin that defines the second pivot axis, wherein, when the user selects the high leverage pivot, the high pivot pin passes through a high pivot opening in the lower jaw, wherein the high pivot opening is configured to allow the high pivot pin to translate relative to the first pivot axis within the high pivot opening.

6. The pliers of claim 1, wherein the lower handle and the upper jaw form one continuous piece and the upper handle and lower jaw do not form one continuous piece.

7. The pliers of claim 1, wherein the selector further comprises a first end and an opposing second end, and wherein the low pivot pin is coupled to the first end of the selector and the high pivot pin is coupled to the second end of the selector.

8. Pliers, comprising:
an upper jaw;
a lower jaw;
an upper handle;
a lower handle coupled to the upper jaw;
a jaw pivot;
a low leverage pivot comprising a low leverage pin and a low leverage pivot opening;
a high leverage pivot comprising:
a high leverage pin;
a high leverage pivot opening defined by the upper jaw; and
a high leverage slot defined by the lower jaw; and
a selector switch that allows a user to select between the low leverage pivot and the high leverage pivot;
wherein, when the user selects the low leverage pivot, the low leverage pin passes through the low leverage pivot opening and couples the upper handle to the lower jaw to pivot about the jaw pivot; and
wherein, when the user selects the high leverage pivot, the high leverage pin passes through the high leverage slot to form the high leverage pivot, the high leverage pivot being configured to allow the high leverage pin to translate relative to the jaw pivot within the high leverage slot.

9. The pliers of claim 8, wherein the low leverage pin is located between a central arm of the selector switch and one of the upper or lower handles, and the high leverage pin is located between the central arm and one of the upper or lower jaws.

10. The pliers of claim 8, wherein the low leverage pivot provides a 1:1 rotational ratio, such that movement of the upper handle relative to the lower handle through a first angle results in movement of the upper jaw relative to the lower jaw by the first angle.

11. The pliers of claim 8, wherein the high leverage pivot provides a rotational ratio greater than 1.25:1, such that movement of the upper handle relative to the lower handle through a first angle results in movement of the upper jaw relative to the lower jaw through an angle greater than 1.25 times the first angle.

12. The pliers of claim 8, further comprising a third leverage pin associated with a third leverage pivot, wherein the selector switch selects among the low leverage pivot, the high leverage pivot, and the third leverage pivot.

13. The pliers of claim 12, wherein the third leverage pivot has a rotational ratio that is greater than the rotational ratio of the low leverage pivot and less than the rotational ratio of the high leverage pivot.

14. The pliers of claim 8, wherein the high lever slot connects to the high leverage opening defined by the upper jaw.

\* \* \* \* \*